United States Patent [19]
Batten et al.

[11] Patent Number: 5,178,754
[45] Date of Patent: Jan. 12, 1993

[54] GREASE AND SOLIDS REMOVAL SYSTEM

[75] Inventors: William C. Batten; B. Glenn Miller, both of Asheboro, N.C.

[73] Assignee: Thermaco, Inc., Asheboro, N.C.

[21] Appl. No.: 702,913

[22] Filed: May 20, 1991

[51] Int. Cl.⁵ .................................... B01D 21/30
[52] U.S. Cl. .................... 210/138; 210/187; 210/195.1; 210/252; 210/532.1; 210/538
[58] Field of Search .............. 210/739, 769, 167, 196, 210/800, 803–806, 808, 97, 102, 103–105, 108–116, 138–140, 194, 195.1, 175, 181, 182, 187, 195.2–197, 251, 258–260, 252, 393, 425, 427, 513, 532.1, 532.2, 533–540

[56] References Cited

U.S. PATENT DOCUMENTS

| | | |
|---|---|---|
| 1,237,068 | 8/1917 | Loeb . |
| 1,850,483 | 3/1932 | Umont . |
| 1,973,235 | 9/1934 | Umont . |
| 3,655,048 | 4/1972 | Pergola ............................ 210/196 |
| 3,687,299 | 8/1972 | Stengelin . |
| 3,769,207 | 10/1973 | Baer . |
| 3,956,126 | 5/1976 | Streebin et al. ................. 210/769 |
| 4,051,024 | 9/1977 | Lowe et al. . |
| 4,235,726 | 11/1980 | Shimko . |
| 4,268,396 | 5/1981 | Lowe . |
| 4,462,915 | 7/1984 | Friedman ....................... 210/167 |
| 4,880,533 | 11/1989 | Hondulas ....................... 210/739 |

Primary Examiner—Frank Sever
Attorney, Agent, or Firm—Rhodes, Coats & Bennett

[57] ABSTRACT

Apparatus for reducing the solids and oil/grease components of a water mixture includes a tank for holding a water mixture for a period during which heavier-than-water components of the water mixture settle to the bottom of the held water mixture and lighter-than-water components rise to the top of the held water mixture. It includes devices for separating solids from liquids in a flow of solids and liquids and for separating oil/grease from water in a flow of oil/grease and water. A first discharge line from the tank adjacent the location of the heavier-than-water components communicates with the device for separating solids from liquids, and a second discharge line from the tank adjacent the location of the lighter-than-water components communicates with the device for separating oil/grease from water. A third discharge line from the tank intermediate the first and second discharge line is provided for the removal of water with reduced solids and oil/grease components.

19 Claims, 4 Drawing Sheets

GREASE AND SOLIDS REMOVAL SYSTEM

BACKGROUND OF THE INVENTION

The present invention relates to improvements in systems for treating a water mixture. In particular, it provides a system for pre-treating wastes from restaurants, food processing facilities and other industrial operations to reduce the concentration of the solids and oil/grease components which burden sewage processing facilities.

This waste generally includes various components derived in the cooking, processing and cleanup stages, mixed into a water vehicle. The components of this waste typically include meat and vegetable scraps, pieces of fat, melted fat, oil and the like. Bakery and food processing plant wastes generally include a variety of greases and oils, along with various solids components. Other industrial operations may include coarse solids and a free floating oil layer. Some of these solids and oil/greases can be successfully treated in conventional sewage treatment plants, but they require a long residence time in the sewage treatment facility and, therefore, are burdensome and expensive for sewage treatment purposes. This is true whether the solids are large pieces or comminuted in a garbage disposal.

Sewage treatment authorities have begun seeking ways to cope with the burdens placed on their capabilities by solids and oil/grease being discharged into the sewers. They have focused on commercial kitchen operations such as restaurants, cafeterias, hotels and motels, casinos, resort complexes, food-processing plants, airports and the like to attempt to decrease the amount of such materials received, or at least equitably spread the cost of treating sewage components. This has become particularly important in recent years as the funding to build additional sewage treatment plants has become scarce.

One of the schemes which sewage treatment authorities have used is to apply a surcharge to sewage treatment bills of commercial kitchen operations to reflect the added demands put upon the sewage treatment facility by sewage emanating from them. In other situations, treatment authorities have required that commercial kitchens simply stop discharging into the sewers, requiring the tanking of the discharge for other disposition. These requirements and their attendant added costs have imposed a burden upon commercial kitchens to deal with the effluent they generate.

It is known to pass the effluent through devices for removing melted oil and melted grease, to permit them to be recycled or otherwise removed from the effluent. Examples of these devices include the GRU grease recovery unit as described in U.S. Pat. Nos. 4,051,024 and 4,268,396 of Lowe Engineering Co., 2 Station Rd., Lincoln Park, N.J. 07035 and the BIG DIPPER Automatic Separating Apparatus as disclosed in U.S. Pat. No. 4,235,726 owned by Thermaco, Inc., assignee of the present application. As used herein, the term "oil/grease" means any material which in its liquid state is lighter than and immiscible in liquid water. Typical examples are the fats, greases and oils generated in kitchen operations, but other examples are lanolin, which may desirably be recovered from wool-treatment operations, and the oils used in machining operations, recovered from coolants used in such operations.

It is also known to use grease traps, particularly in-ground grease traps to separate floatable grease components from water, but these have been undesirable because they generate noxious odors and require periodic cleaning, a very unpleasant task. In addition, the costs associated with the disposal of the materials removed from these grease traps has soared as government regulations governing the disposal of these materials have been adopted.

Even with these operations, the effluent still has a high degree of biochemical oxygen demand because of the non-grease solids. A recent development by the assignee of the present application, Thermaco, Inc., and marketed under the name BIG FLIPPER has proven itself quite capable of moving solids from the effluent flow. The disclosure of U.S. patent application Ser. No. 07/557,962 filed Jul. 25, 1990 in the name of Batten and Miller covering such apparatus is incorporated by reference.

In addition, in some situations the solids and oil/grease have substantial value and it is desirable to recover these components. An example is the recovery of lanolin from wool processing operations.

However, the art still is without unitary, systemized means of automatically removing and recovering both oil/grease and solids from a water mixture to substantially reduce the burden on sewage treatment facilities in an easy-to-use, convenient, clean and sanitary fashion.

SUMMARY OF THE INVENTION

The present invention fulfills this need in the art by providing apparatus for reducing the solids and oil/grease components of a water mixture including a tank for holding a water mixture for a period during which heavier-than-water components of the water mixture settle to the bottom of the held water mixture and lighter-than-water components rise to the top of the held water mixture. It includes devices for separating solids from liquids in a flow of solids and liquids and for separating oil/grease from water in a flow of oil/grease and water. A first discharge line from the tank adjacent the location of the heavier-than-water components communicates with the device for separating solids from liquids, and a second discharge line from the tank adjacent the location of the lighter-than-water components communicates with the device for separating oil/grease from water. A third discharge line from the tank intermediate the first and second discharge lines is provided for the removal of water with reduced solids and oil/grease components.

In one embodiment the first discharge line includes a pump for pumping a flow of solids and liquids from the tank to the device for separating solids and liquids. The second discharge line may also include a pump for pumping a flow of oil/grease and liquids from the tank to the device for separating oil/grease and water. If so, it is preferably a non-shearing lift pump. A control means may be provided for periodically activating the pumps to pump from the tank to the separating devices.

In a particularly preferred embodiment the first and second discharge lines merge to form a merged line downstream of the tank and supply their respective flows to both of the separating devices in series. The merged line inputs to the device for separating solids and liquids and the device for separating solids and liquids has an output of separated liquids to the device for separating oil/grease and water. Desirably, the device for separating oil/grease from water has an output of separated water communicating with the tank to recycle relatively clear water to the tank.

Preferably, the apparatus includes a heating means in the tank to heat at least a portion of the water mixture in the tank to a temperature at which the oil/grease is liquid. Also preferably, the apparatus includes a backwash line supplying heated water to the second discharge line to maintain oil/grease in the line in flowable form and to flush oil/grease from the line.

In another embodiment the first and second discharge lines merge to form a merged line downstream of the tank and a first valve in the merged line adjacent the merger of the first and second discharge lines selectively permits flow from either of the first or second discharge lines. A pump is provided in the merged line for pumping flows from the discharge lines, and a second valve is provided downstream of the pump for selectively directing the flow to either of the separating devices. This embodiment also may include a control means for controlling the valves to direct flow from the first discharge line to the means for separating solids and liquids and for directing flow from the second discharge line to the device for separating oil/grease from water.

The control means for the apparatus preferably includes a valve control switch, a pump control switch, a tank heater control switch, a backwash control switch, a control switch for the device for separating oil/grease from water, and a control switch for the device for separating solids from liquids. Preferably, the control means has a timer for generating control signals and applying the control signals to the switches to:
 a. actuate the tank heater,
 b. substantially simultaneously:
  i. actuate the valve control and the pump control switches to pump from the first discharge line,
  ii. actuate the control switch for the device for separating solids from liquids, and
  iii. actuate the control switch for the device for separating oil/grease from water, and
 c. substantially in sequence to
  i. deactuate the pump control switch,
  ii. deactuate the control switch for the device for separating solids from liquids, and
  iii. deactuate the control switch for the device for separating oil/grease from water.

In another aspect, the invention provides a method for reducing the solids and oil/grease components of a water mixture and includes holding a water mixture for a period during which heavier-than-water components of the water mixture settle to the bottom of the held water mixture and lighter-than-water components rise to the top of the held water mixture. A first flow of water and heavier-than-water components of the held water mixture is discharged from the bottom of the held water mixture, and solids are separated from liquids in the first flow. A second flow of water and lighter-than-water components of the held water mixture is discharged from the top of the held water mixture, and oil/grease is separated from the water in the second flow. A third flow of water with reduced solids and oil/grease components is discharged from the held water mixture.

The steps of discharging first and second flows may include pumping the flows. Preferably, the pumping does not shear the flow. Desirably, the pumpings of the first and second flows occur periodically.

In one embodiment both of the first and second flows are applied to both of the separating steps in series. Desirably, the flows are first applied to the step of separating solids and liquids, followed by applying liquids from the step of separating solids and liquids to the step of separating oil/grease and water. This may be followed by applying water separated in the step of separating oil/grease and water to the held water mixture.

Desirably, the process includes heating at least a portion of the held water mixture to a temperature at which the oil/grease is liquid.

In another embodiment each of the flows are selectively passed to the separating steps. The flows may be selectively pumped through a common pump and selectively directed downstream of the pump to either of the separating steps.

BRIEF DESCRIPTION OF THE DRAWINGS

The invention will be better understood from a reading of the Detailed Description of the Preferred Embodiments and a review of the Drawings in which.

DETAILED DESCRIPTION OF THE PREFERRED EMBODIMENTS

Figure 1:
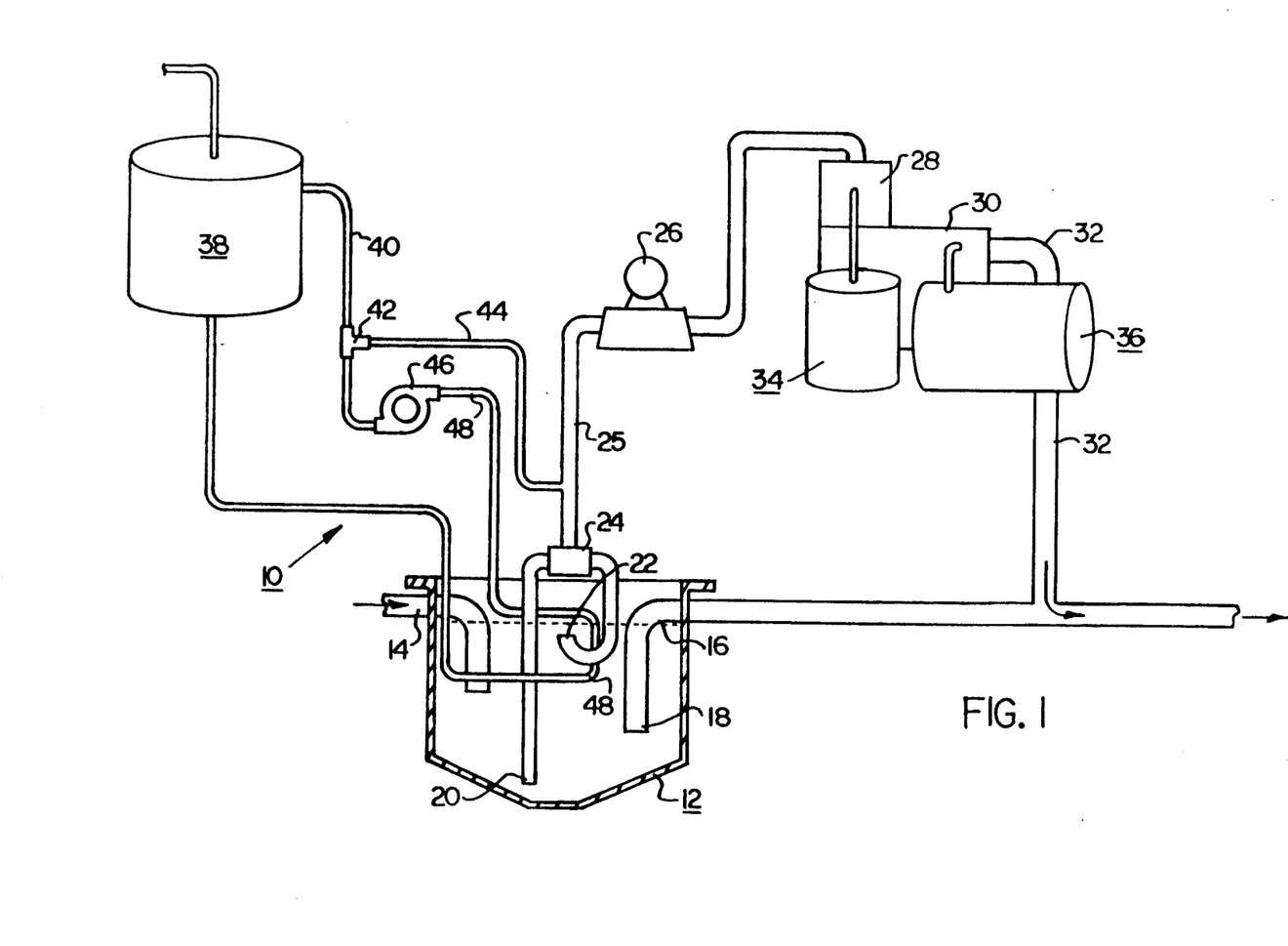
FIG. 1 is a schematic view of one embodiment of a system according to the invention.

FIG. 1 illustrates in schematic form a system 10 according to one embodiment of the invention. A sump tank 12 is provided, typically in-ground, but not necessarily. It preferably has a tapered or slanted bottom so that solids collect at one point at the bottom of the tank. An inlet pipe 14 is provided to the tank 12 and connected to the source of the effluent or water mixture to be separated. A discharge line 18 is provided at an elevation slightly below the inlet pipe 14 on the tank 12, so as to define the static water line 16. The discharge line 18 has a lower terminus towards the bottom of the tank 12 so that the water flowing out of the discharge line 18 to the sewer is taken from near the bottom of the tank 12. Preferably the inlet pipe 14 and discharge line 18 are spaced from one another in tank 12 to minimize direct flow from pipe 14 to line 18.

Located near the bottom of the tank 12 is the terminus of a solids discharge line 20, and located just below the static water line 16 is a oil/grease discharge line 22. The discharge lines 20, 22 are commonly connected to a valve 24, operable to direct the discharge either of lines 20, 22 to downstream pipe 25. A lift pump 26 is provided in downstream pipe 25 to lift the discharges of lines 20, 22 to an automatic solids removal system 28.

Preferably, the automatic solids removal unit 28 is a BIG FLIPPER unit sold by Thermaco, Inc., mentioned above. Other solids removal systems may be used. The solids removal system 28 de-waters the solids by applying the mixture of water and solids supplied by the pipe 25 to a moving strainer so that the water falls through the strainer and solids are transported on the strainer to a solids container 34.

The water which falls from the strainer is received in automatic oil/grease recovery system 30, preferably a BIG DIPPER grease recovery system, described above. Typically, oil/grease recovery systems operate at elevated temperatures to assure that all of the grease is liquified. Grease and oil, being lighter than water, floats on the surface of the water in the grease recovery unit. An oleophilic surface is passed upwardly out of the body of oil/grease and water, with oil/grease adhering to the oleophilic surface. A scraper scrapes the liquid oil/grease from the oleophilic surface and directs it to a oil/grease storage container 36. Water in the container is discharged to an outlet 32. Since the water in outlet 32 has had solids and oil/grease removed, it is merged with the effluent from the discharge line 18 to the sewer.

System 10 also includes connections to a conventional water heater 38 to provide heat to the water mixture in tank 12 to maintain the grease in liquid form. Thus, a hot water supply 40 is connected to a valve 42 which alternately directs water along line 44 to introduce the hot water to the effluent in downstream pipe 25 to raise its temperature and to flush out the line 44. This backwash feature prevents build-up of grease in the system. Alternately, the hot water is directed through line 48 in which a circulating pump 46 is disposed. Pipe 48 has a portion submerged in the tank 12, serving to heat the water and other components held in the tank 12 to liquefy the oil and grease components therein. The valve 42 is switched as needed to liquefy grease in either tank 12 or pipe 25.

Also included in the system 10, but not shown in FIG. 1, is a control panel which controls the pump, valve, automatic solids removal system, and automatic grease recovery system described above to operate on a periodic basis. The periodic basis can be selected as desired according to the load of oil/grease and solids being applied to the tank 12 and the sizes of the various components of the system. A similar arrangement will be described for the embodiment of FIG. 2 which, taken with the skill of those in the art, will be sufficient to arrange a suitable control panel.

In operation, the flow from the kitchen or other source arriving at inlet pipe 14 is discharged into tank 12. Solid components of the flow which are heavier than water will settle to the bottom of the tank 12, and oil/grease components, being lighter than water, will rise to the top of tank 12. On a periodic basis, the lift pump 26 and valve 24 are actuated to draw water and solids from the bottom of tank 12 through solids discharge line 20, up through the solids removal 28, in which the solids are de-watered. The de-watered solids are deposited in a solids container 34 which can be periodically dumped, such as by taking to, for example, a landfill, incinerator, composting system or to an animal feed processing operation. The water is applied to the automatic oil/grease recovery system 30 by virtue of that system's being directly in line with the outlet of the solids removal system 28. The water arriving in the automatic recovery system 30 will cause relatively oil/grease-free held water in the oil/grease recovery system 30 to be discharged through outlet 32. Operation of the automatic grease recovery system will remove the oil/grease from the mixture held in the system 30 for collection in oil/grease storage container 36 which can be periodically removed and taken to a suitable disposal or recycling facility.

Subsequently, the pump 26 and valve 24 are operated to remove water and oil/grease from the top of the fluids held in tank 12 along discharge line 22. These are again applied to both the automatic solids removal system and the automatic grease recovery system as described above.

The fluids drawn by lift pump 26 from each of lines 20,22 are applied to both removal systems 28,30 because there will always be some of one in the other. That is, although the solids mostly accumulate at the bottom of tank 12, some are lighter than water (consider wine bottle corks and the like) and some of the solids will entrain grease so that grease will be present at the bottom of tank 12. Of course, if desired, only the materials taken by discharge line 20 can be applied to the solids removal system, and only the materials taken by the oil/grease discharge line 22 could be applied to the oil/grease recovery system 30.

Desirably, the valve 42 is actuated to apply hot water to the downstream pipe 25 during, prior to or after, the removal of liquids or solids from the tank 12. At other times, pump 46 and valve 42 are actuated to circulate hot water through the tank 12 to maintain the oil/grease in the tank 12 in liquid form.

Figure 2:
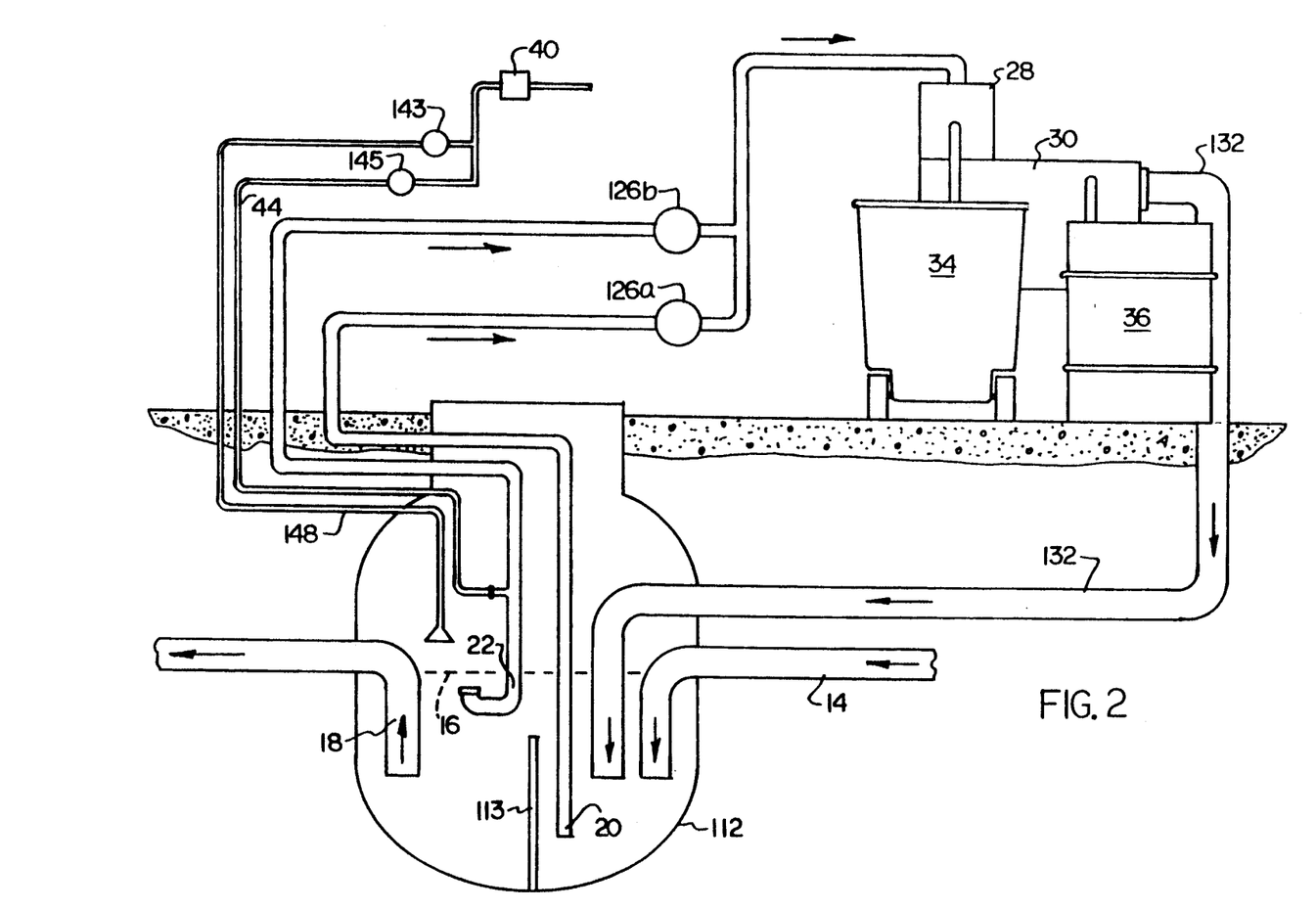
FIG. 2 is a schematic view of an alternative embodiment.

Referring now to FIG. 2, an alternative embodiment is shown, but with numerous parts the same and numerous parts performing similar functions. The parts which are the same are identically numbered and those with similar functions are given numbers 100 greater than the numbers of their counterparts in FIG. 1.

The tank 112 of FIG. 2 is configured slightly differently from the tank 12 of FIG. 1 in having a rounded bottom and a baffle 113 installed its lower portion. The inlet line 114 discharges below the top of the baffle, but it and the effluent line 18 define a water level 16 well above the top of the baffle 113. The baffle thus tends to separate the tank 112 into a solids collection portion and a relatively solids-free portion. If desired, the two portions could even be provided as two separate tanks, connected by piping to provide the communication between portions shown in FIG. 2. The oil/grease discharge line 22 and the effluent flow line 18 are disposed in the portion relatively free of solids. Lines 20,22 are provided with independent lift pumps 126a, 126b, respectively. In both this embodiment and the embodiment of FIG. 1, the lift pump for lifting the oil/grease component is preferably designed to be non-shearing, so that the oil/grease remains separated from the water in phase and does not become mechanically emulsified. Excessive shearing generates extremely fine droplets of oil/grease, which take a long time to rise to the top in the oil/grease recovery system 30. The outlet of the pumps 126, 126b is applied to the automatic solids removal unit 28 and automatic oil/grease recovery unit 30 as before.

In this embodiment, instead of directing the cleaned flow from the oil/grease recovery 30 to the cleaned effluent flow line 18, it is reapplied to the separation tank 112 in line 132. This feature could be used with either embodiment.

The heating scheme for this embodiment is also varied somewhat from the embodiment of FIG. 1. The hot water supply line 40 is broken into a line 44 and a line 148 terminating in a nozzle in the top of the tank 112. Line 44 is provided with electrically operable control valve 145 and line 148 is provided with control valve 143. Thus, the valve 145 may be operated as desired to apply backwash water through line 44 to the oil/grease and water as they are being pumped from the top of separation tank 112, or before or after the pump is operated to clean the lines and prevent grease build-up. Preheat control valve 143 may be used to apply hot water to the top of the tank 112 to liquefy the oil/grease as it is held in the tank 112. As will be apparent, this arrangement could also be used with the embodiment of FIG. 1 as could the alternate tank 112 of this embodiment. Various other heating schemes may also be employed.

Figure 3:
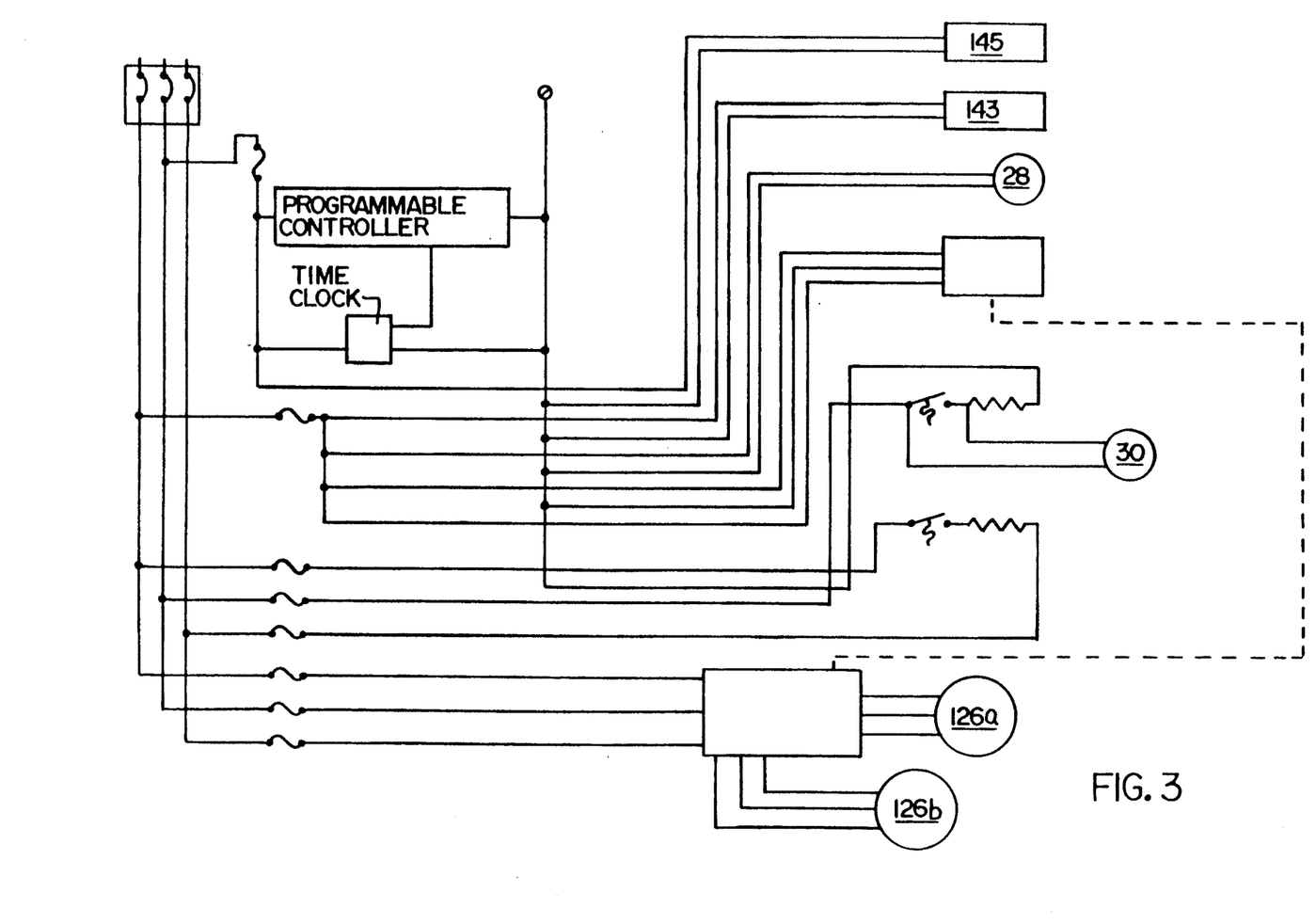
FIG. 3 is a wiring diagram for a system such as the embodiment according to FIG. 2.
Figure 4:
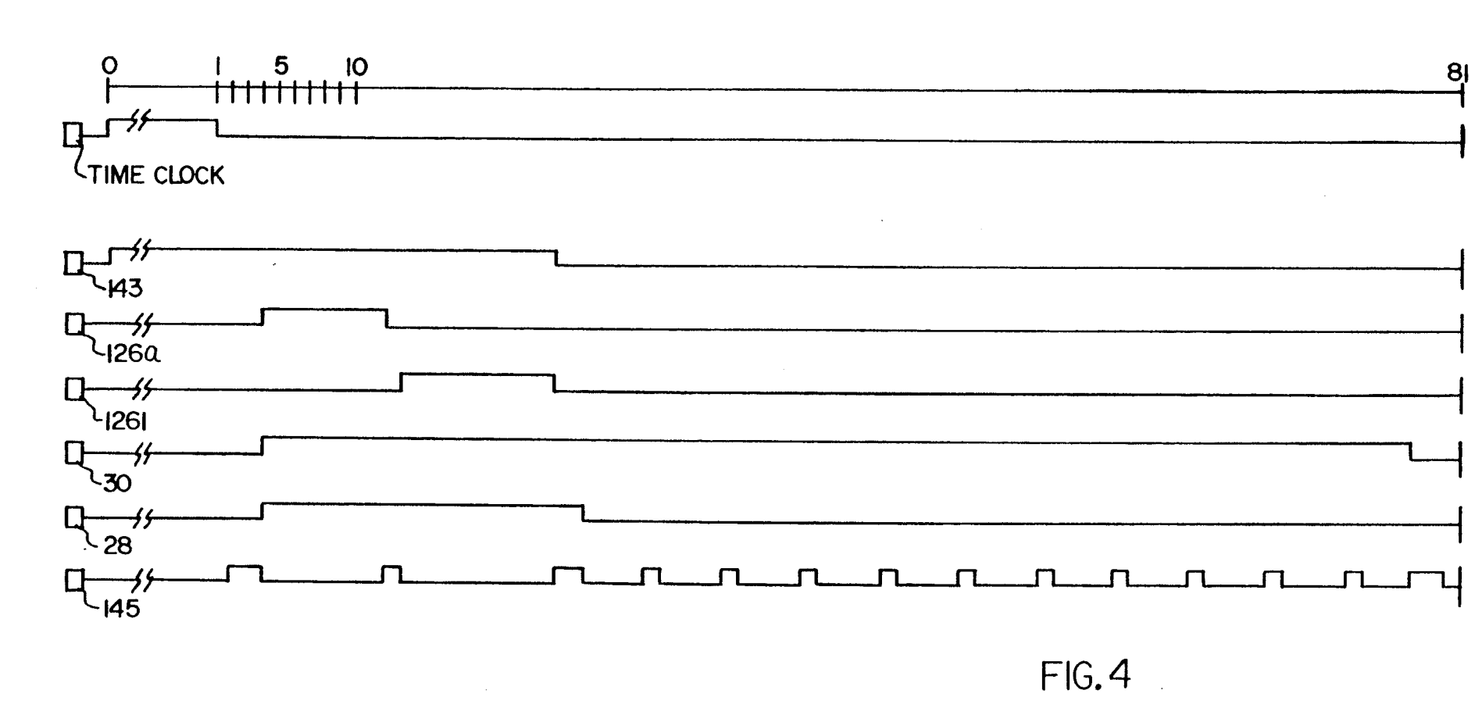
FIG. 4 is a timing diagram for operation of a system such as the embodiment of FIG. 2.

FIG. 3 illustrates a wiring diagram for one possible installation in accordance with the embodiment of FIG. 2. The various motors and valves depicted in that apparatus can be actuated according to a timing sequence as shown in FIG. 4 under the control of a programmable controller such as a Divelbiss programmable controller (not shown in FIG. 2). Thus, the operation of various components will be controlled by the programmable controller in the sequence shown in FIG. 4.

Operation according to that schedule calls for the preheat water valve 143 to be opened initially to apply hot water to the top of the tank 112 to raise its temperature. That hot water valve remains open throughout the period of pumping from the tank 112. After a preset period of time, the backwash water valve 145 is also open for a short period to raise the temperature of the line 22. Following that, the solids lift pump 126a is turned on along with the solids removal system 28 and the oil/grease recovery system 30. After a preset period of time (selected to be such that further pumping from discharge line 20 would draw substantially only water from the bottom of separation tank 112), solids lift pump 126a is turned off. Backwash water valve 145 is then turned on for a brief cycle to again raise the temperature of the oil/grease discharge line 22 and then turned off, followed by operation of the oil/grease lift pump 126b to remove oil/grease and water from adjacent the water line 16. After a preset period (selected to be long enough so that further pumping draws substantially only relatively clear water on discharge line 22), the oil/grease lift pump 126b is turned off. At this point, the backwash water valve 145 is turned on again to again raise the temperature of the line 22 and to flush out any remaining oil/grease. After a short cycle, it is turned off along with turning off the solids removal system 28. As will be apparent, the solids removal unit 28 remained on during pumping from both the lines 20,22 to remove solids which may have either been heavier than water and therefore removed by line 20 or lighter than water and therefore removed by line 22.

The oil/grease recovery system 30 remains on for an extended period, because the removal of the oil/grease from the water by the scraping of the oil surface as described above is a rather lengthy operation. Periodically during such operation, backwash water valve 145 is turned on to maintain the static liquid level in the oil/grease recovery system 30 at the desired level while helping to maintain the desired temperature. After the end of that cycle, the operation can be conducted again. Typically, one full cycle lasts approximately three hours.

As will be apparent, throughout the operation of the cycle, additional kitchen waste will be arriving on line 14 in separation tank 112. As it does so, the solids will settle out to the bottom of tank 112 and the oil/grease will rise to the top of the water mixture held in tank 112. The water line 16 is maintained by discharges of cleaned effluent from the middle of tank 112 along line 18.

Another possible schedule using a 1 pump system could be as follows:
1. Start tank heater.
2. Start backwash and liquids/solids separation apparatus.
3. Stop backwash.
4. Switch valve to solids discharge line.
5. Start pump.
6. Stop pump.
7. Switch valve to oil/grease discharge line.
8. Start backwash.
9. Stop backwash.
10. Start pump.
11. Start oil/grease separation apparatus.
12. Stop pump.
13. Stop tank heater.
14. Start backwash.
15. Stop backwash.
16. Stop oil/grease separation apparatus.

The operation of a prototype device has proven to be very effective in separating oil/grease and solids from the effluent. In particular, in one installation in a casino over a ton of oil/grease and over a half ton of food solids per week were separated from the kitchen effluent, vastly decreasing the load on the local sewage authorities and the demands it placed on the commercial kitchen operator. The invention has the advantage of permitting continuous high-efficiency removal of solids and oil/grease from a water mixture, even if the automatic solids removal unit or automatic oil/grease removal unit are temporarily disabled for maintenance or repair. Also, the oil/grease and solids may be recovered in a potentially useful, recyclable form.

As will be apparent, various modifications to the apparatus can be made and still achieve the desired effect of reducing the solids and oil/grease components of the effluent. One possible variant includes installing tank 12, 112 in a preexisting grease trap.

The source of the effluent to be treated should not be construed as being limited in any fashion as long as it has components of oil/grease and solids which are desirably separated.

What is claimed is:

1. Apparatus for reducing the solids and oil/grease components of waste water comprising the elements of:
   a settling tank for holding waste water for a period during which heavier-than-water components of the waste water settle to the bottom of the held waste water and lighter-than-water components rise to the top of the held waste water,
   a device for separating solids from liquids in a flow of solids and liquids,
   a first discharge line from the said tank adjacent the location of the heavier-than-water components communicating with said device for separating solids from liquids and including a pump for pumping a flow of solids and liquids from said tank to said device for separating solids and liquids,
   a device for separating oil/grease from water in a flow of oil/grease and water,
   a second discharge line from said tank adjacent the location of the lighter-than-water components communicating with said device for separating oil/grease from water,
   means for enabling said elements to coact to sequentially and/or simultaneously provide a solids discharge mode and an oil/grease discharge mode, and
   a third discharge line from said tank intermediate said first and second discharge lines for the removal of water with reduced solids and oil/grease components.

2. Apparatus as claimed in claim 1 wherein said second discharge line includes a pump for pumping a flow of oil/grease and liquids from said tank to said device for separating oil/grease and water.

3. Apparatus as claimed in claim 2 wherein said pump is a non-shearing lift pump.

4. Apparatus as claimed in claim 1 wherein
said first discharge line includes a pump for pumping a flow of solids and liquids from said tank to said device for separating solids and liquids,
said second discharge line includes a pump for pumping a flow of oil/grease and liquids from said tank to said device for separating oil/grease and water,
and further comprising a control means for periodically activating said pumps to pump from said tank to the separating devices.

5. Apparatus as claimed in claim 1 wherein said first and second discharge lines merge to form a merged line downstream of said tank and supply their respective flows to both of said separating devices in series.

6. Apparatus as claimed in claim 5 wherein said merged line inputs to said device for separating solids and liquids and said device for separating solids and liquids has an output of separated liquids to said device for separating oil/grease and water.

7. Apparatus as claimed in claim 6 wherein said device for separating oil/grease from water has an output of separated water communicating with said tank to recycle relatively clear water to said tank.

8. Apparatus as claimed in claim 1 further comprising a heating means in said tank to heat at least a portion of the water mixture in said tank to a temperature at which the oil/grease is liquid.

9. Apparatus as claimed in claim 1 wherein
said first and second discharge lines merge to form a merged line downstream of said tank and supply their respective flows to both of said separating devices in series, and
said merged line includes a pump for pumping flows from said discharge lines to said separating devices.

10. Apparatus as claimed in claim 9 wherein said pump is a non-shearing lift pump.

11. Apparatus as claimed in claim 9 further comprising a valve in said merged line for selectively permitting flow from either of said first or second discharge lines.

12. Apparatus as claimed in claim 1 wherein
said first and second discharge lines merge to form a merged line downstream of said tank and
a first valve in said merged line adjacent the merger of said first and second discharge lines for selectively permitting flow from either of said first or second discharge lines,
a pump in said merged line for pumping flows from said discharge lines,
a second valve downstream of said pump for selectively directing the flow to either of said separating devices.

13. Apparatus as claimed in claim 12 further comprising
a control means for controlling said valves to direct flow from said first discharge line to said means for separating solids and liquids and for directing flow from said second discharge line to said device for separating oil/grease from water.

14. Apparatus as claimed in claim 1 further comprising a backwash line supplying heated water to said second discharge line to maintain oil/grease in said second discharge line in flowable form and to flush oil/grease from said second discharge line.

15. Apparatus for reducing the solids and oil/grease components of a water mixture comprising the elements of
a tank for holding a water mixture for a period during which heavier-than-water components of the water mixture settle to the bottom of the held water mixture and lighter-than-water components rise to the top of the held water mixture,
a heating means in said tank to heat at least a portion of the water mixture in the tank to a temperature at which the oil/grease is liquid,
a device for separating solids from liquids in a flow of solids and liquids,
a first discharge line from the said tank adjacent the location of the heavier-than-water components communicating with said device for separating solids from liquids including a pump for pumping a flow of solids and liquids from said tank to said device for separating solids and liquids,
a device for separating oil/grease from water in a flow of oil/grease and water,
a second discharge line from said tank adjacent the location of the lighter-than-water components communicating with said device for separating oil/grease from water including a non-shearing pump for pumping a flow of oil/grease and from said tank to said device for separating oil/grease and water,
a backwash line supplying heated water to said second discharge line to maintain oil/grease in said second discharge line in flowable form and to flush oil/grease from said second discharge line,
means for enabling said elements to coact to sequentially and/or simultaneously provide a solids discharge mode and an oil/grease discharge mode, and
a third discharge line from said tank intermediate said first and second discharge lines for the removal of water with reduced solids and oil/grease components.

16. Apparatus for reducing the solids and oil/grease components of waste water comprising the elements of:
a tank for holding a water mixture for a period during which heavier-than-water components of the water mixture settle to the bottom of the held water mixture and lighter-than-water components rise to the top of the held water mixture, said tank to a temperature at which the oil/grease is liquid,
a device for separating solids from liquids in a flow of solids and liquids having a first output for separated liquids,
a device for separating oil/grease from water in a flow of oil/grease and water downstream from said first output for separated liquids and having a second output of separated water communicating with said tank to recycle relatively clear water to said tank,
a first discharge line from said tank adjacent the location of the heavier-than-water components,
a second discharge line from said tank adjacent the location of the lighter-than-water components,
a backwash line supplying heated water to said second discharge line to maintain oil/grease in said second discharge line in flowable form and to flush oil/grease from second discharge line,
a merged line downstream of said first and second discharge lines, and including a pump for pumping flows from said first and second discharge lines and a valve in said merged line for selectively permitting flow in said merged line from either of said first or second discharge lines, means for enabling said elements to coact to sequentially and/or simultaneously provide a solids discharge mode and an oil/grease discharge mode, and a third discharge line from said tank intermediate said first and second discharge lines for the removal of water with reduced solids and oil/grease components.

17. Apparatus as claimed in claim 16 wherein said enabling means further comprises a valve control switch, a pump control switch, a tank heater control switch, a backwash control switch, a control switch for said device for separating oil/grease from water, and a control switch for said device for separating solids from liquids.

18. Apparatus as claimed in claim 17 wherein said enabling means further comprises a timer for generating control signals and applying said control signals to said switches to:

a. actuate said tank heater,
b. substantially simultaneously:
  i. actuate said valve control and said pump control switches to pump from said first discharge line,
  ii. actuate said control switch for said device for separating solids from liquids, and
  iii. actuate said control switch for said device for separating oil/grease from water, and
c. substantially in sequence to
  i. deactuate said pump control switch,
  ii. deactuate said control switch for said device for separating solids from liquids, and
  iii. deactuate said control switch for said device for separating oil/grease from water.

19. Apparatus as claimed in claim 17 wherein said enabling means further comprises a timer for generating control signals and applying said control signals to said switches to:

a. actuate said tank heater,
b. substantially simultaneously:
  i. actuate said backwash control switch,
  ii. actuate said control switch for said device for separating solids from liquids, and
c. substantially in sequence to
  i. deactuate said backwash control switch,
  ii. switch said valve to direct discharge to said solids discharge line,
  iii. actuate said pump,
  iv. deactuate said pump,
  v. switch said valve to direct discharge to said oil/grease discharge line,
  vi. actuate said backwash control switch,
  vii. deactuate said backwash control switch,
  viii. actuate said pump,
  ix. actuate said control switch for said device for separating oil/grease from liquids,
  x. deactuate said pump,
  xi. deactuate said tank heater,
  xii. actuate said backwash control switch,
  xiii. deactuate said backwash control switch, and
  xiv. deactuate said control switch for said device for separating oil/grease from liquids.

* * * * *

UNITED STATES PATENT AND TRADEMARK OFFICE
CERTIFICATE OF CORRECTION

PATENT NO. : 5,178,754
DATED : January 12, 1993
INVENTOR(S) : William C. Batten et al.

It is certified that error appears in the above—identified patent and that said Letters Patent is hereby corrected as shown below:

Column 10, Line 27 insert --liquids-- to read:
"a flow of oil/grease and liquids from..."

Signed and Sealed this

Thirtieth Day of November, 1993

Attest:

BRUCE LEHMAN

Attesting Officer

Commissioner of Patents and Trademarks